No. 883,926. PATENTED APR. 7, 1908.
M. W. ALEXANDER & W. JOHNSON.
FASTENING FOR BUCKETS OF TURBINES.
APPLICATION FILED OCT. 6, 1906.
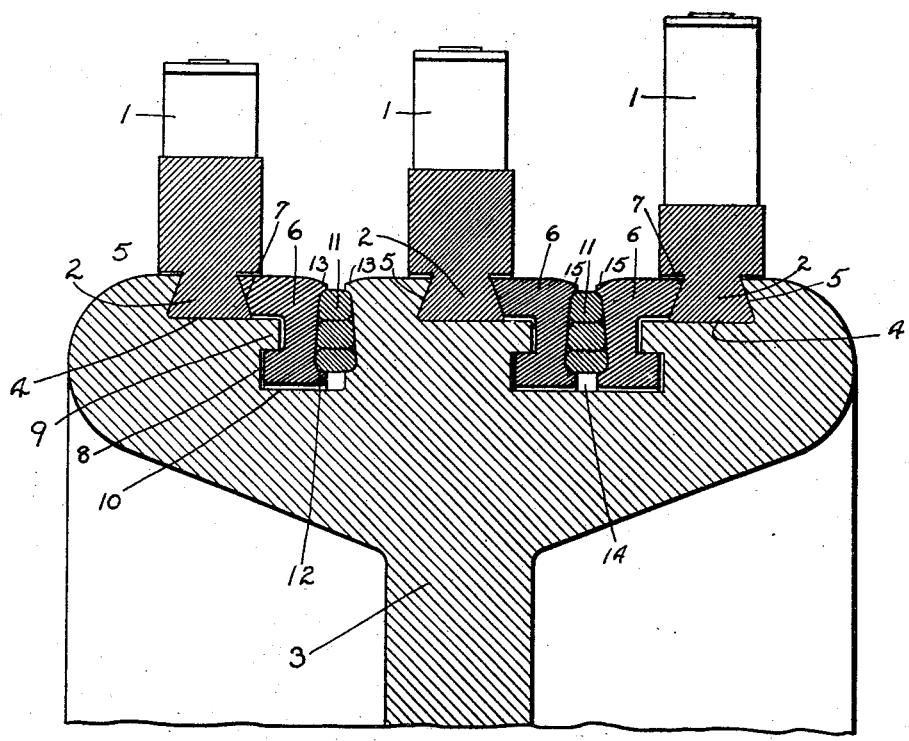
Witnesses.
A. Gordon Hamilton
Helen Orfoust
Inventors.
Magnus W. Alexander,
Werner Johnson,
by Albert G. Davis
Atty.

UNITED STATES PATENT OFFICE.

MAGNUS W. ALEXANDER AND WERNER JOHNSON, OF LYNN, MASSACHUSETTS, ASSIGNORS TO GENERAL ELECTRIC COMPANY, A CORPORATION OF NEW YORK.

FASTENING FOR BUCKETS OF TURBINES.

No. 883,926.

Specification of Letters Patent.

Patented April 7, 1908.

Application filed October 6, 1906. Serial No. 337,704.

*To all whom it may concern:*

Be it known that we, MAGNUS W. ALEXANDER and WERNER JOHNSON, citizens of the United States, residing at Lynn, county of Essex, State of Massachusetts, have invented certain new and useful Improvements in Fastenings for the Buckets of Elastic-Fluid Turbines, of which the following is a specification.

This invention relates to means for securing the buckets of elastic fluid turbines to the bucket wheels or other carriers.

In view of the centrifugal strains developed at high speeds it is necessary to provide strong and unyielding fastening devices when separately-formed buckets, or segmental bases carrying a plurality of buckets, are attached to the periphery of a bucket wheel. In addition to resisting centrifugal strains, provision must be made for holding the buckets rigidly in a given plane of revolution, since any deflection therefrom might wreck the machine by causing the buckets to strike the stationary intermediates or other parts.

Our invention aims to accomplish the desired results in a simple and reliable manner. To this end, the shank of the bucket, or the segmental base support for a plurality of buckets, is dovetailed or ribbed so as to engage beneath an undercut or overhanging flange along one edge of a groove in the wheel or other carrier. A segmental clamping ring is placed on the other side of the bucket shank or support, having a flange shaped to engage with the dovetail or rib on said shank or support. The ring is received in a deep groove adjacent to the one in which the buckets are supported, and said deep groove is undercut to receive a corresponding projection on the ring. In order to retain the ring in place, a wire is wound into the space between said ring and the opposite wall of the deep groove. To assist in keeping the wire in place the walls of the space into which it is wound are made diverging from top to bottom, and the wire is preferably hammered or calked into said space. The edges of the groove and the clamping ring may be staked over the outer turn of wire to prevent it from flying out. The coiled wire presents great resistance to centrifugal force, and forms a practically solid filling for the space in which it is wound, so that the clamping ring is rigidly supported, and the bucket or segmental base is firmly held thereby.

The accompanying drawing is a cross-section of the rim of a bucket-wheel embodying our invention.

The buckets 1 are provided with a dovetailed or ribbed support 2. If the buckets are separately formed, said support is a shank integral with the blade. If several buckets are cut in or secured to a segmental base, said base constitutes the support, and is ribbed or dovetailed in the manner shown.

The rim of the wheel or other carrier 3 is grooved to receive the supports 2. In the drawing, provision is made for three rows of buckets, but this number may be diminished or increased as desired. A smooth surface 4 is made, upon which the bucket-supports 2 rest. Adjacent to the surface 4 is an undercut flange 5 fitting snugly against one side of the dovetailed or ribbed portion of the support 2. A clamping ring 6 is placed on the opposite side of the support 2, having a flange 7 which fits snugly against said support. This ring is made in segments, and in order to keep them from flying off, they are provided with a lateral rib 8 which fits under a shoulder 9 formed in one wall of a deep groove 10 which is turned in the carrier 3 adjacent to the surface 4. The groove is wide enough to permit the ring segments to be dropped into it and then slid laterally to cause the flange 7 to engage with the support 2, and the rib 8 to take under the shoulder 9. This lateral movement of the ring toward the bucket-support leaves a space between its other side and the adjacent wall of the groove 10. Into this space is wound a flexible retainer, such as a wire 11, each turn being hammered or calked so as to flatten it somewhat and cause it to abut solidly against the sides of the ring and groove. The ring is preferably made with a flange 12 at its inner edge on which the inner layer of wire rests, to resist any tilting of the ring. The walls of the space in which the wire is wound are preferably inclined, converging toward the top, so that any tendency of the wire to fly out under centrifugal strain will be effectually resisted. To secure the wire still further, the outer edges of the ring and the groove may be staked over the outer layer of wire, as indicated at 13. This construction applies to a single row of buckets, as shown at the left-hand side of the drawing.

When two bucket-supports are used, their clamping rings may be secured by one wrapping of wire, as shown at the right-hand side of the drawing. In this case the flanges 5 face each other, and the groove 14 for the rings is nearly twice as wide as the groove 10, and is shouldered or undercut in each wall. The wire is wound in the space between the two rings, and is calked into place and secured by staking the adjacent edges of the rings at 15. A wire wrapping of this kind, if composed of wire that does not easily stretch, is capable of withstanding very great centrifugal strains. It is easily and quickly applied, and is preferably wound under tension, to avoid any chance of looseness or play. It can be readily ripped out when a bucket or bucket segment needs to be removed.

In accordance with the provisions of the patent statutes, I have described the principle of operation of my invention, together with the apparatus which I now consider to be the best embodiment thereof; but I desire to have it understood that the apparatus shown is only illustrative and that the invention can be carried out by other means.

What we claim as new and desire to secure by Letters Patent of the United States, is,—

1. The combination with a grooved bucket-carrier, of buckets mounted thereon, and means for fastening said buckets, comprising a flexible retainer wrapped around said carrier after the buckets are mounted in place.

2. The combination with a grooved bucket-carrier, of bucket-supports mounted thereon, a clamping ring engaging with said supports, and a flexible retainer wrapped around said carrier and engaging with said ring.

3. The combination with a grooved bucket-carrier, of bucket-supports engaging therewith, a clamping ring engaging with said supports, and a wire wound around said carrier and retaining said ring in place.

4. The combination with a grooved bucket-carrier having an undercut flange, of bucket-supports shaped to engage under said flange, a clamping ring having a flange to engage with said support, and a wire wrapped adjacent to and engaging with said ring.

5. The combination with a bucket-carrier having a flange and a groove provided with a shoulder, a bucket-support engaging under said flange, a clamping ring engaging with said support and having a rib taking under said shoulder, and a wire wound in the groove adjacent to said ring.

6. The combination with a bucket-carrier having a groove provided with a shoulder, of a bucket-support on said carrier, a clamping ring entering said groove and engaging with said shoulder, and a wire wound into the space between said ring and the wall of the groove.

7. The combination with a bucket-carrier having a groove provided with a shoulder, of a bucket-support on said carrier, a clamping ring entering said groove and engaging with said shoulder, and a wire wound into the space between said ring and the wall of the groove, said space having walls diverging downwardly.

8. The combination with a bucket-carrier having a groove provided with a shoulder, of a bucket-support on said carrier, a clamping ring entering said groove and engaging with said shoulder, and a wire wound into the space between said ring and the walls of the groove, said wire being calked to make it abut solidly against the sides of the ring and groove.

9. The combination with a bucket-carrier having a groove provided with a shoulder, of a bucket-support on said carrier, a clamping ring entering said groove and engaging with said shoulder, and a wire wound into the space between said ring and the wall of the groove, said ring having a flange at its inner edge upon which said wire rests.

10. The combination, with a grooved bucket carrier, of buckets mounted thereon, and a flexible retainer which is wound around the carrier in layers, each layer being independently restrained against centrifugal force.

In witness whereof, we have hereunto set our hands this third day of October, 1906.

MAGNUS W. ALEXANDER.
WERNER JOHNSON.

Witnesses:
JOHN A. MCMANUS, Jr.,
ALLEN H. RUSSELL.